United States Patent
Oliver et al.

(10) Patent No.: US 11,138,243 B2
(45) Date of Patent: Oct. 5, 2021

(54) INDEXING GEOGRAPHIC DATA

(71) Applicant: International Business Machines Corporation, Armonk, NY (US)

(72) Inventors: William J. Oliver, Tucson, AZ (US); Wojciech J. Wyzga, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 767 days.

(21) Appl. No.: 14/198,787

(22) Filed: Mar. 6, 2014

(65) Prior Publication Data

US 2015/0254274 A1  Sep. 10, 2015

(51) Int. Cl.
G06F 16/00 (2019.01)
G06F 16/29 (2019.01)
G06F 16/22 (2019.01)

(52) U.S. Cl.
CPC .............. *G06F 16/29* (2019.01); *G06F 16/22* (2019.01)

(58) Field of Classification Search
CPC ....... G06F 17/3087; G06F 16/22; G06F 16/29
See application file for complete search history.

(56) References Cited

U.S. PATENT DOCUMENTS

| | | | |
|---|---|---|---|
| 5,893,093 A | 4/1999 | Wills | |
| 6,954,764 B2 | 10/2005 | Biswas et al. | |
| 7,197,500 B1 | 3/2007 | Israni et al. | |
| 7,231,405 B2 | 6/2007 | Xia | |
| 7,801,897 B2 | 9/2010 | Egnor | |
| 9,098,747 B1* | 8/2015 | Stewart | G06K 9/00651 |
| 2002/0107918 A1 | 8/2002 | Shaffer et al. | |
| 2002/0156779 A1 | 10/2002 | Elliott et al. | |
| 2004/0220957 A1* | 11/2004 | McDonough | G06F 17/30241 707/999.102 |
| 2005/0278378 A1 | 12/2005 | Frank | |
| 2006/0129593 A1* | 6/2006 | Slovak | G06F 17/30616 707/999.102 |
| 2006/0149774 A1* | 7/2006 | Egnor | G06F 17/3087 707/999.102 |

(Continued)

FOREIGN PATENT DOCUMENTS

WO    2004013739 A2    2/2004

OTHER PUBLICATIONS

Dutton, "Encoding and Handling Geospatial Data with Hierarchical Triangular Meshes", Jul. 27, 1998, Department of Geography, University of Geography, University of Zurich, CH-8057, 11 pages.

(Continued)

*Primary Examiner* — Dinku W Gebresenbet
(74) *Attorney, Agent, or Firm* — Farrokh Pourmirzaie; Edell, Shapiro & Finnan, LLC

(57) ABSTRACT

According to one embodiment of the present invention, a system provides access to geographic information. The system generates an index including information and one or more identifiers each indicating a corresponding geographic area pertaining to the information. The system processes a query against the index to provide information aggregated for corresponding geographic areas. Embodiments of the present invention further include a method and computer program product for providing access to geographic information in substantially the same manners described above.

24 Claims, 7 Drawing Sheets

(56) References Cited

U.S. PATENT DOCUMENTS

| | | | |
|---|---|---|---|
| 2007/0127555 A1* | 6/2007 | Lynch | G06F 17/3087 |
| | | | 375/142 |
| 2008/0010273 A1 | 1/2008 | Frank | |
| 2008/0046506 A1* | 2/2008 | Broda | G06F 9/4443 |
| | | | 709/203 |
| 2009/0100007 A1* | 4/2009 | Campbell | G06F 17/3087 |
| 2009/0327271 A1* | 12/2009 | Amitay | G06F 17/30675 |
| 2012/0170802 A1* | 7/2012 | Millar | G06K 9/00785 |
| | | | 382/103 |
| 2012/0226889 A1* | 9/2012 | Merriman | G06F 17/30333 |
| | | | 711/216 |
| 2013/0002675 A1* | 1/2013 | Hicks | H04W 24/08 |
| | | | 345/440 |
| 2014/0040371 A1* | 2/2014 | Gurevich | H04W 4/21 |
| | | | 709/204 |
| 2014/0078183 A1* | 3/2014 | Watson | G06T 3/40 |
| | | | 345/667 |

OTHER PUBLICATIONS

Markowetz et al., "Exploiting the Internet as a Geospatial Database", Aug. 4, 2003, International Workshop on Next Generation Geospatial Information, Cambridge, Massachusetts, 3 pages.

Esri, "Esri Maps for IBM Cognos", An Esri White Paper, Sep. 2012, Redlands, CA, 21 pages.

SAS, "SAS Web OLAP Viewer for Java", Fact Sheet, copyright 2005, 4 pages.

\* cited by examiner

INDEXING GEOGRAPHIC DATA

BACKGROUND

1. Technical Field

Present invention embodiments relate to a geographic information system (GIS), and more specifically, to indexing geographic-related information, including hierarchical attributes, in a manner that facilitates rapid access and display.

2. Discussion of the Related Art

Managers in law enforcement organizations use computer statistics systems to monitor activity in areas under their jurisdiction over an interval of time (e.g., the past twenty-four hours) and compare that activity to previous times (e.g., the previous week, month, year, etc.). These systems typically produce paper reports that take hours or days to compile. This limits the usefulness of the reports to answering predetermined questions.

BRIEF SUMMARY

According to one embodiment of the present invention, a system provides access to geographic information. The system generates an index including information and one or more identifiers each indicating a corresponding geographic area pertaining to the information. The system processes a query against the index to provide information aggregated for corresponding geographic areas. Embodiments of the present invention further include a method and computer program product for providing access to geographic information in substantially the same manners described above.

BRIEF DESCRIPTION OF THE SEVERAL VIEWS OF THE DRAWINGS

Generally, like reference numerals in the various figures are utilized to designate like components.

DETAILED DESCRIPTION

Present invention embodiments relate to indexing information in a geographic information system (GIS). In one embodiment, geographic information is associated to predefined regions, and an index of the information is built. Information is represented in the index in manners that support searching, aggregation, and drill-down of geographic and non-geographic dimensions. For example, the predefined regions be may represented by string values (e.g., using Geohash or other encoding). Likewise, links between levels of hierarchical dimensions (e.g., categories and subcategories) may be encoded in string fields. One aspect of a present invention embodiment includes a user interface that reacts quickly to a user's interactive selection of filter criteria across multiple data dimensions as a result of fast query processing using the index.

Figure 1:
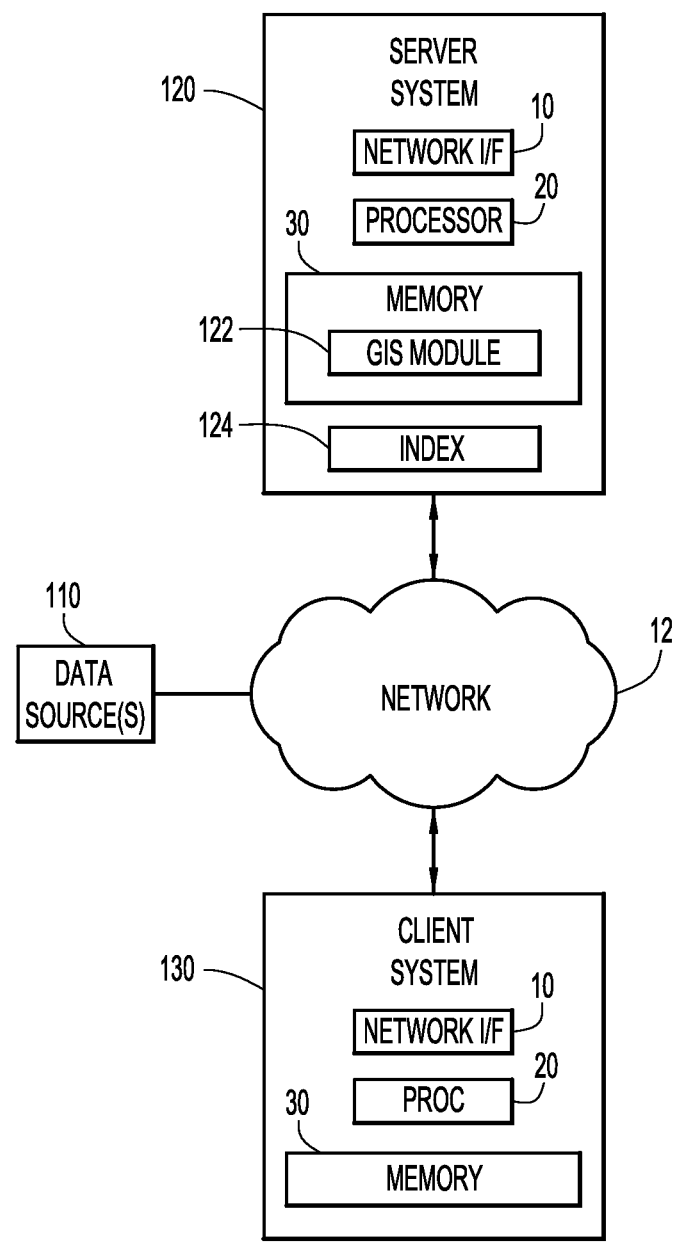
FIG. 1 is a diagrammatic illustration of an example environment for an embodiment of the present invention.

An example environment for present invention embodiments is illustrated in FIG. 1. Specifically, the environment includes one or more data sources 110, one or more server systems 120, and one or more client or end-user systems 130. Data sources 110, server systems 120, and client systems 130 may be remote from each other and communicate over a network 12.

Network 12 may be implemented by any number of any suitable communications media (e.g., wide area network (WAN), local area network (LAN), Internet, intranet, etc.). Alternatively, any number of data sources 110, server systems 120, and client systems 130 may be local to each other, and communicate via any appropriate local communication medium (e.g., local area network (LAN), hardwire, wireless link, intranet, etc.).

A data source 110 includes information associated with one or more geographic locations. For example, a data source may include documents of various types (e.g., incident reports, traffic citations, arrest reports, etc.) containing or associated with a location, date, time, motor vehicle make and model, etc. A data source 110 may be implemented by any conventional information storage system (e.g., relational database, file system server, etc.).

A server system 120 may include a GIS module 122 and an index 124 of information from data sources 110. The GIS module and/or index may be implemented across plural server systems. Alternatively, the GIS module and/or index may reside on a client system 130 or other computer system in communication with the client system.

Client systems 130 enable users to communicate with the GIS module (e.g., via network 12). The client systems may present any graphical user (e.g., GUI, etc.) or other interface (e.g., command line prompts, menu screens, etc.) to receive commands from users and interact with the GIS module, index, and/or other modules or services.

Server systems 120 and client systems 130 may be implemented by any conventional or other computer systems preferably equipped with a display or monitor, a base (e.g., including at least one processor 20, memories 30 and/or internal or external network interface or communications devices 10 (e.g., modem, network cards, etc.), optional input devices (e.g., a keyboard, mouse, or other input device), and any commercially available and custom software (e.g., index software, database software, etc.).

The server system, client system, and/or GIS module may include one or more modules or units (e.g., GIS module, interface module, document crawler module, etc.) to perform the various functions of present invention embodiments described below (e.g., preprocessing and inserting data into the index, searching the index, aggregating data, generating graphical displays, presenting graphical displays, receiving user selections, etc.), may be implemented by any combination of any quantity of software and/or hardware modules or units, and may reside within memory 30 of a server system and/or client systems for execution by processor 20.

In one embodiment of the present invention, index 124 may be a reverse index. The reverse index may be managed using conventional or other indexing tools (e.g., Apache Lucene/Apache Solr), which support record insertion, text search, facet search, etc. For example, the index may be managed using Lucene software, and the GIS module may be a server based on the Solr search engine infrastructure. Alternatively, the index may be implemented as a relational database table or other searchable, associative data structure (e.g., hash table, tree, etc.).

Initially, items of information associated with corresponding geographic locations are read from data source 110, pre-processed, and used to build index 124. For example, in the case of a computer statistics system for law enforcement organizations, items of information residing in data source 110 may include traffic citations, incident reports, arrest reports, and the like, where each item is associated with a geographic location (e.g., the location at which a traffic citation was issued) and may include other information (e.g., date, time, vehicle make and model, driver, etc.). For each item of information selected from data source 110, a record is prepared and inserted into index 124. Each record (sometimes referred to as a "document" or a "row") comprises one or more fields (sometimes referred to as "columns" or "dimensions"), where each field logically comprises a name-value pair (e.g., name="DATE", value="2014-01-01"). Fields to be included in an aggregate may be stored in index-only mode to reduce the size of the index. The index may be used to search for records by specifying conditions on the values of the fields.

Figure 2:
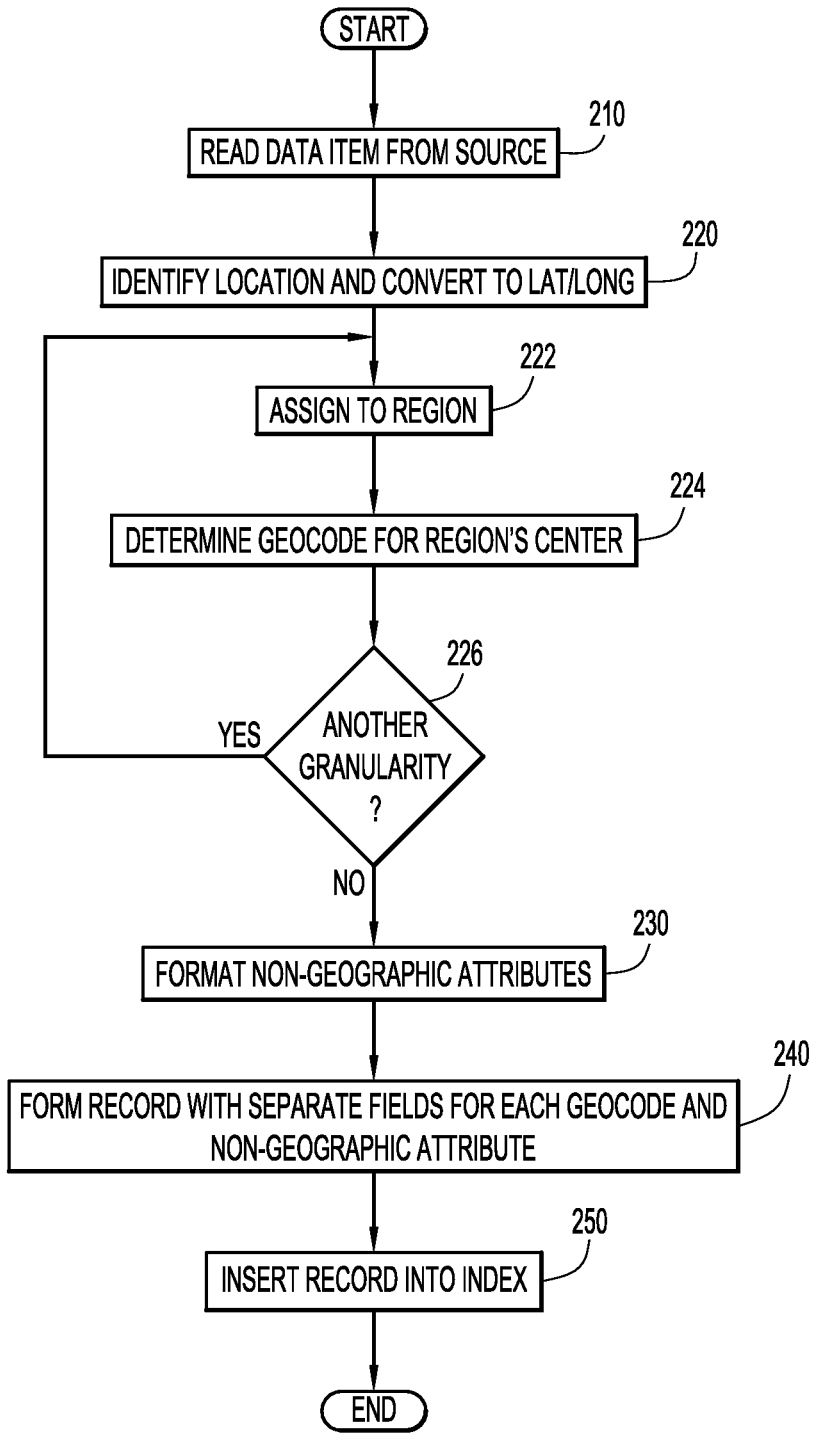
FIG. 2 is a flow diagram illustrating an example manner of preparing a geographic information record for insertion into an index according to an embodiment of the present invention.
Figure 3:
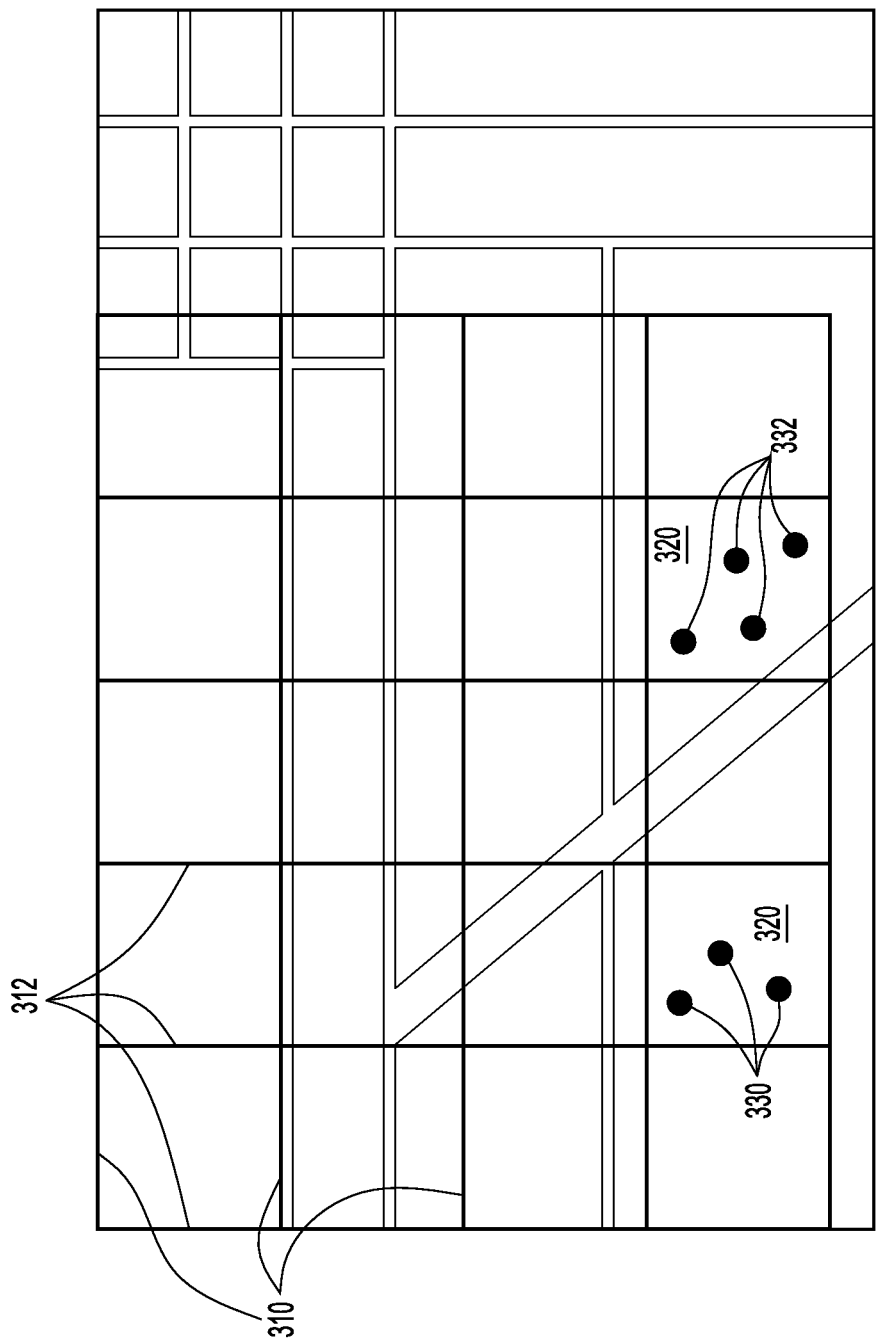
FIG. 3 illustrates an example partitioning of a geographic area into regions and association of geographic locations to regions according to an embodiment of the present invention.

An example manner of creating a record for insertion into index 124 (e.g., via processor 20 and GIS module 122) according to an embodiment of the present invention is illustrated in FIGS. 2 and 3. In particular, an item of information (e.g., a traffic citation, incident report, arrest report, etc.) is selected and read from data source 124 at step 210.

At step 220, geographic information associated with the item (e.g., an address, global positioning system (GPS) measurement, etc.) is identified and converted into latitude and longitude values to form coordinates of a geographic point.

At step 222, the geographic point is associated to a geographic region. An example manner in which an area may be partitioned into predefined regions is illustrated in FIG. 3. In particular, the geographic area may be partitioned into predefined regions bounded by lines of constant latitude 310 and longitude 312 that are integer multiples of a constant d (e.g., 0.05 degrees), to form regions 320 that are "squares" in latitude-longitude coordinates with dimensions d×d (not shown to scale). The geographic point is associated to the region that contains it. This region may be determined by rounding the latitude-longitude coordinates of the point to those of the closest center of a predefined region. Accordingly, geographic points 330 (FIG. 3) are grouped together by association to one region 320, and geographic points 332 are grouped together by association to a separate region 320.

At step 224, the coordinates of the center of the region to which the geographic point is associated are encoded into a string. For example, the coordinates may be converted into a string using Geohash encoding. Geohash encoding allows for removing characters from the end of the string to reduce its size, with an accompanying loss of precision; the Geohash codes of nearby locations often (but not always) have similar prefixes.

The geographic point may be further associated to one or more additional predefined regions to provide a range of spatial granularities. For example, the geographic area may be partitioned into latitude-longitude squares for a plurality of values of the constant d (e.g., 0.1°, 0.05°, 0.0025°, 0.0125°, 0.00625°, etc.), and the geographic point may be associated to a region of each granularity. The granularity may have any size; however, beyond five decimal places of precision, the latitude resolution is less than one meter, which is better than typically needed for aggregating GIS information. The number and sizes of granularities may be user-configurable parameters. At step 226, it is determined whether a region of another granularity (e.g., another value of d) remains to be associated to the geographical point. If so, processing returns to step 222. A separate field is defined for the Geohash code of each level of granularity.

At step 230, non-geographic attributes (e.g., date, car make and model, etc.) associated with the item of information are identified. These attributes may be converted into a common format (e.g., dates may be converted to the form YYYY-MM-DD or the like). Non-geographic attributes of the item that have a hierarchical or dependent relationship to another attribute of the item may be represented in a format that links a category or child attribute (e.g., the model of the car) to its parent attributes(s) (e.g., the make of a car). In particular, a separate field (e.g., a text string) may be defined for each child attribute and for each parent attribute. The value of the field for a child attribute may be formed by concatenating the child attribute and each of its parent attributes in order (e.g., from top-level parent to child), where each attribute is separated and surrounded by one or more predetermined characters. For example, a vehicle make (e.g., Toyota) and model (e.g., Prius) may have a field named "MAKE" with a value "TOYOTA" and a field named "MODEL" with a value "+TOYATA+PRIUS+", where "+" is the predetermined separating/surrounding character. Surrounding each value completely with the predetermined character(s) facilitates parsing and matching the string. Storing the parent attribute(s) in the same field as the child attribute protects against losing the parent-child link if the child attribute is associated with more than one parent (e.g., if two makes of car used the same model name). These fields may be used to create facet counts with dependent (e.g., multi-level, hierarchical, etc.) levels of information in the index.

At step 240, a record is formed that contains a field for each Geohash code and non-geographic attribute. The record is stored in the index at step 250.

An example record illustrating a manner in which fields may be defined for the indexing is shown in Table 1 below. In particular, a field named "RecordID" has a value that is a unique identifier for this record. A field named "Date" has a value indicating the date of the record. A field named "Makes" has a value for each vehicle make associated with this data item. A field named "Models" has, for each vehicle, a string value combining the make and model strings, so that index values and searches may maintain the parent-child relationship of those values. A field named "Geohash1" has a value representing the Geohash code associated with a first region (e.g., latitude-longitude square). A field named "Geohash2" has a value representing the Geohash code associated with a second region of a smaller size than the first region, and represents a finer level of granularity in spatial location. Multiple distinct values in a single field are supported in conventional indexing technology (e.g., Lucene, Solr, etc.) using a multi-value field data type.

TABLE 1

Example record

| RecordID | Date | Makes | Models | Geohash1 | Geohash2 |
|---|---|---|---|---|---|
| 1 | 2014-01-01 | TOYOTA FORD | +TOYOTA + PRIUS+ +FORD + F100+ | 6gkzwgjz | 6gkzwgjzn820 |

Figure 4:
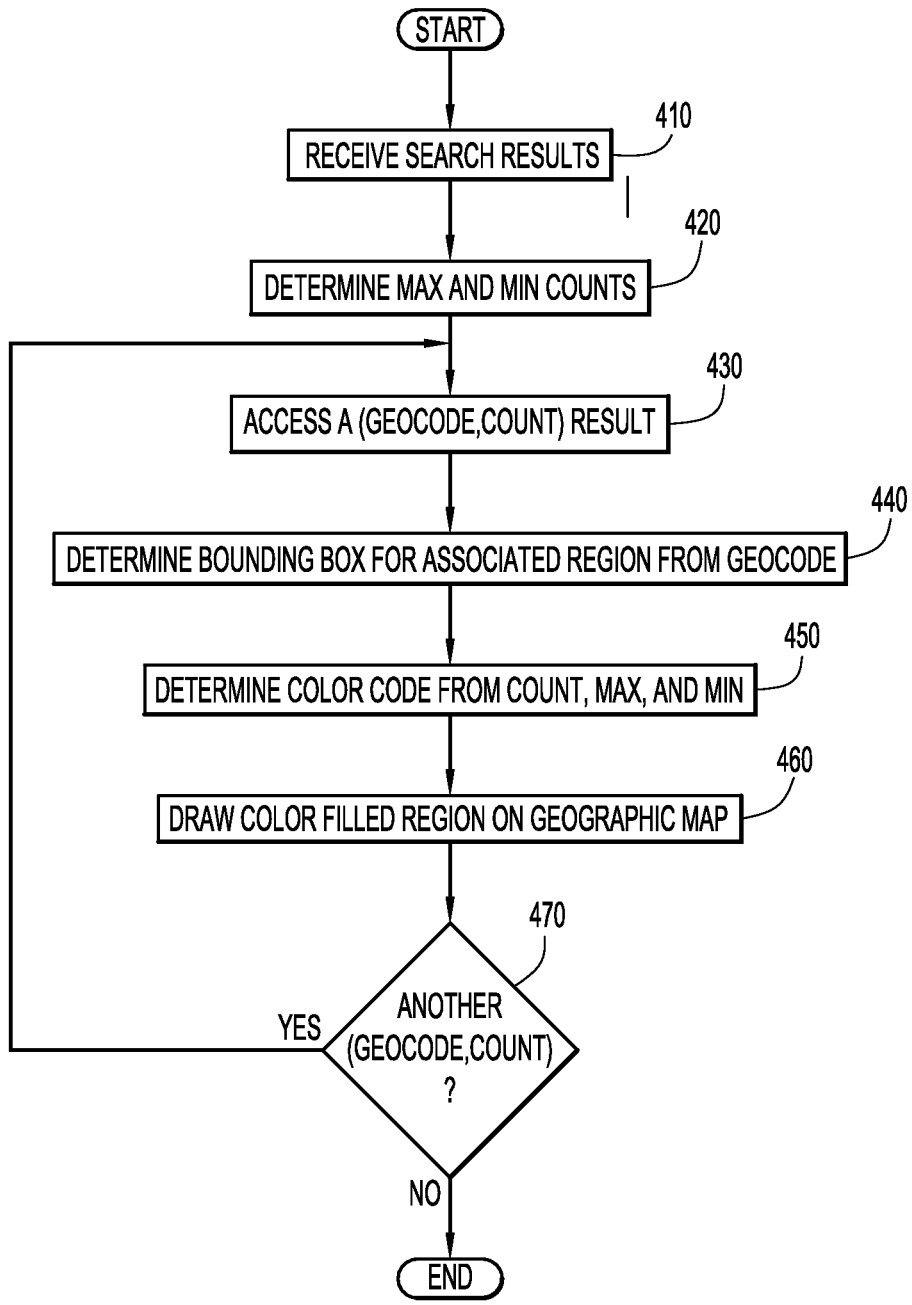
FIG. 4 is a flow diagram illustrating an example manner of generating a visual display of aggregated geographic information according to an embodiment of the present invention.

GIS module 122 may search index 124 (e.g., in response to a query via client system 130 and network 12) to produce aggregated data for each predefined region and generate information for a visual display of the aggregated data on an electronic geographical map. An example manner of generating a visual display of aggregated geographic information contained in an index according to an embodiment of the present invention is illustrated in FIG. 4. Initially, GIS module 122 searches the index. For example, the GIS module may search the index in response to a query requesting a count of records for the current year for each region (e.g., each region of the coarsest granularity partition). The GIS module may process the query using a facet search of the index. A facet search is a fast procedure for returning counts of records in the index that have a specified field value. In particular, at step 410, the GIS module receives a set of search results. Each result comprises a Geohash code for a predefined regions and a count of the number of matching records for that Geohash code. At step 420, the GIS module performs an initial loop over the results to determine the maximum count B and the minimum count A. The GIS module then begins another loop over the results. For reach result, the GIS module accesses the Geohash code and count at step 430.

At step 440, the GIS module determines a boundary for the region indicated by the Geohash code. For example, if the predefined regions are latitude-longitude squares, the GIS module may convert the Geohash code to latitude and longitude coordinates that specify the center of the region. The region is bounded by latitude (longitude) lines half the region width above and below (left and right of) the center.

At step 450, the GIS module determines a color code to indicate the count C of matching records in the region relative to the maximum and minimum counts A and B. For example, the color code may be specified by red, green, and blue intensities having values (in hexadecimal) ranging from 00 to FF, where the red intensity is (C−A)/(B−A)×FF and the blue intensity is (B−C)/(B−A)×FF. In other words, the color tends toward blue as the count tends toward the maximum count, and the color tends toward red as the count tends toward the minimum count. Alternatively, any color coding scheme may be used.

At step 460, a region with the boundary determined at step 440 and the fill-color determined at step 450 is drawn on an electronic geographic map. Alternatively, the count C, relative count (C−A)/(B−A), or other measure of aggregate information for the region may be indicated using a non-color scheme (e.g., greyscale, text and printed within the region, a number of marker symbols drawn within the region, elevation of the region in a perspective view, hash line density, etc.).

The GIS module may transmit a specification of the image to be drawn to client system 130, which may render the image on a local display. Alternatively, the GIS module may draw the image on a local display.

At step 470, the GIS module determines whether the search results include another region that remains to be drawn. If so, processing returns to step 430. Otherwise, processing ends.

Figure 5:
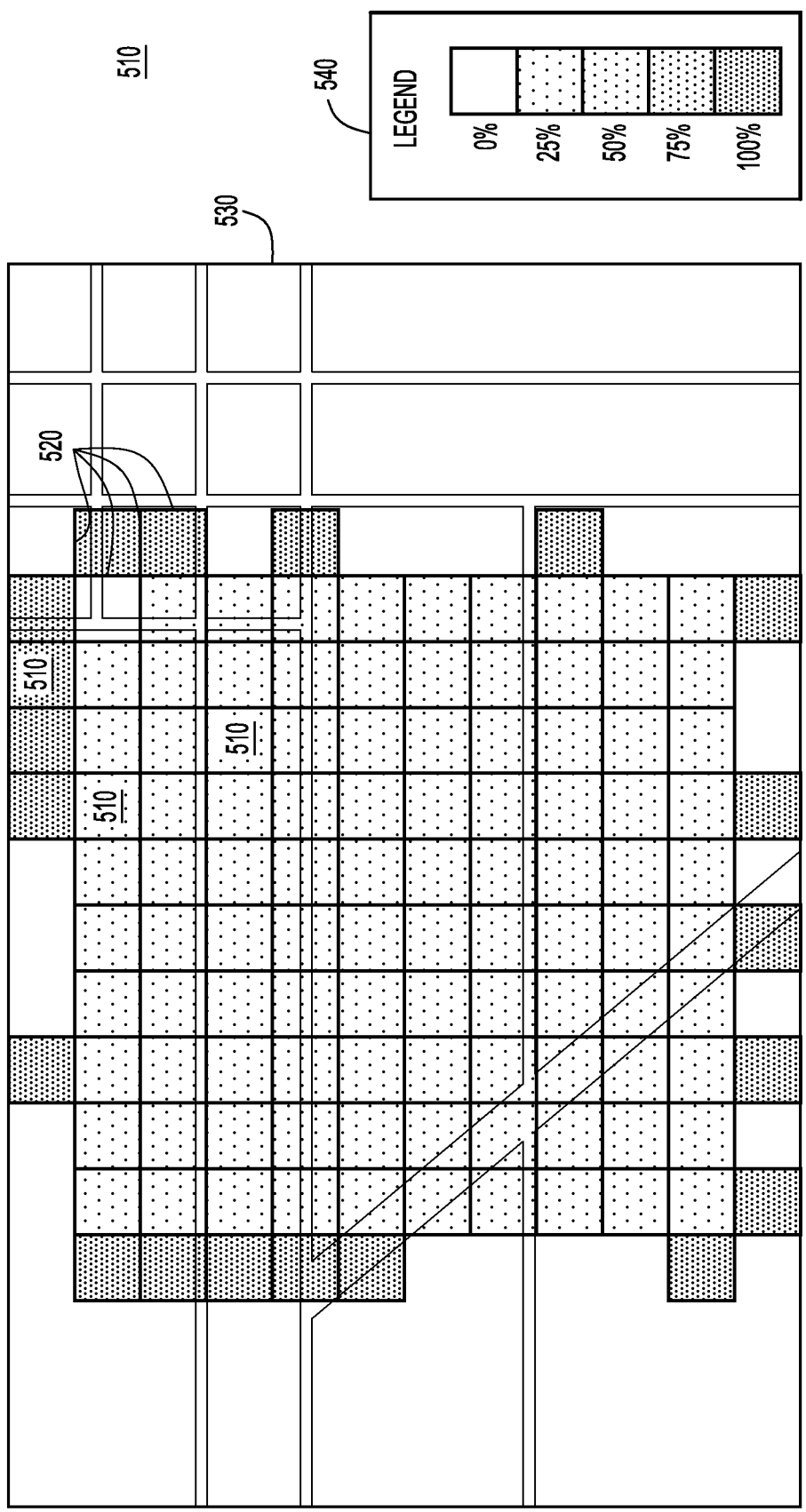
FIG. 5 is an example visual display of aggregated geographic information according to an embodiment of the present invention.

An example visual display of aggregated geographic information according to an embodiment of the present invention is illustrated in FIG. 5. In particular, aggregate counts of records for regions 510 with boundaries 520 are drawn on geographic map 530. The relative counts for each region 510 are indicated by shading according to legend 540.

Figure 6:
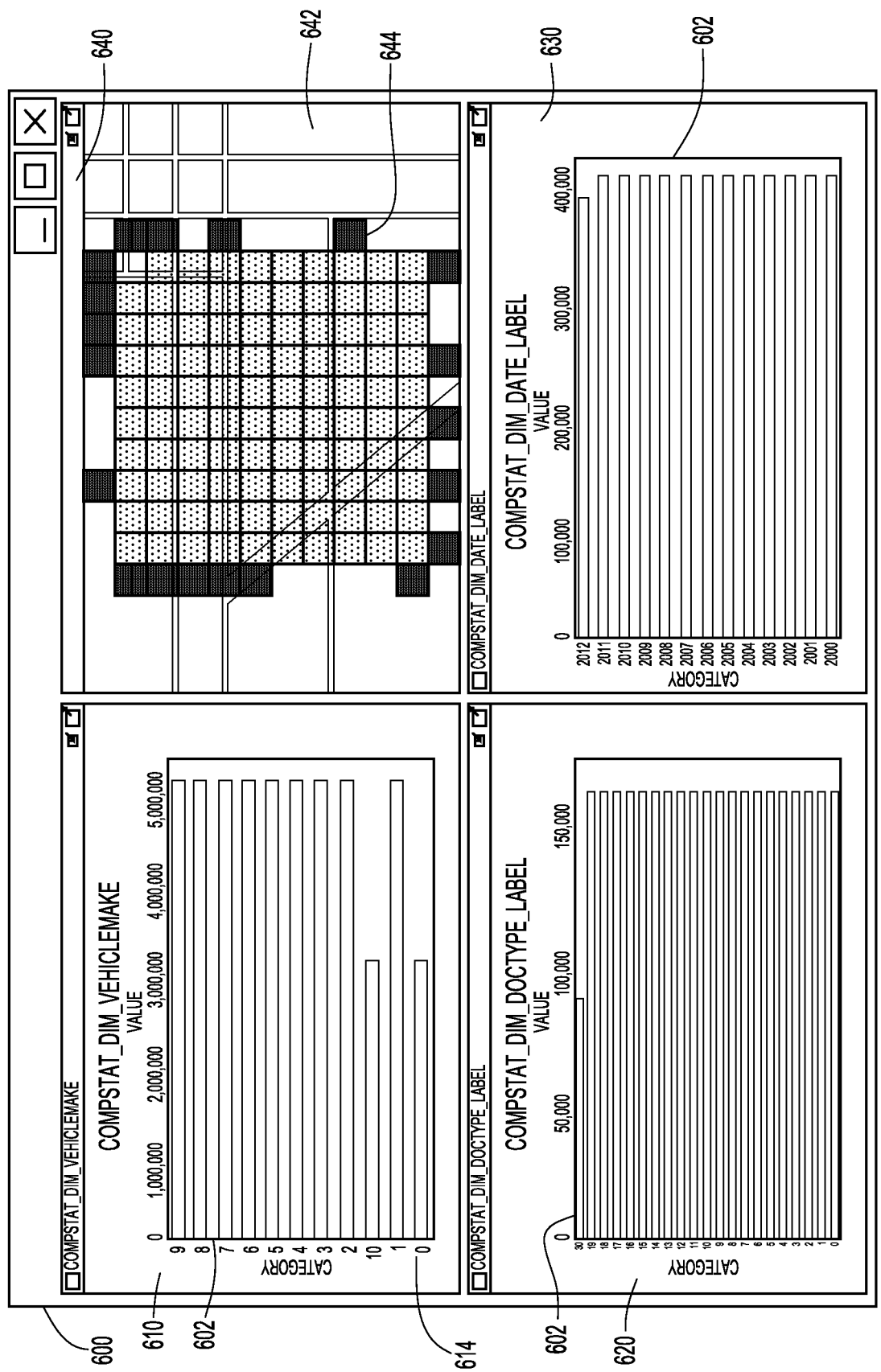
FIG. 6 is an illustration of an example user interface for accessing geographic information according to an embodiment of the present invention.

An example user interface for accessing geographic information according to an embodiment of the present invention is illustrated in FIG. 6. In particular, user interface 600 includes views 610, 620, 630, and 640 showing count distributions for four example dimensions: vehicle make, document type, date, and geographic region, respectively. For each non-geographic dimension (e.g., make, document type, and date), the number of counts for each category or field value is shown in a bar chart 602. The distribution of counts over geographic regions is displayed on a map 642. A user may select a category or region for which to view results. For example, a user may select a particular vehicle make by clicking on the corresponding text label 614 of bar chart 612 in view 610. Likewise, a user may select a geographic region by clicking on a corresponding region 644 of map 642.

Figure 7:
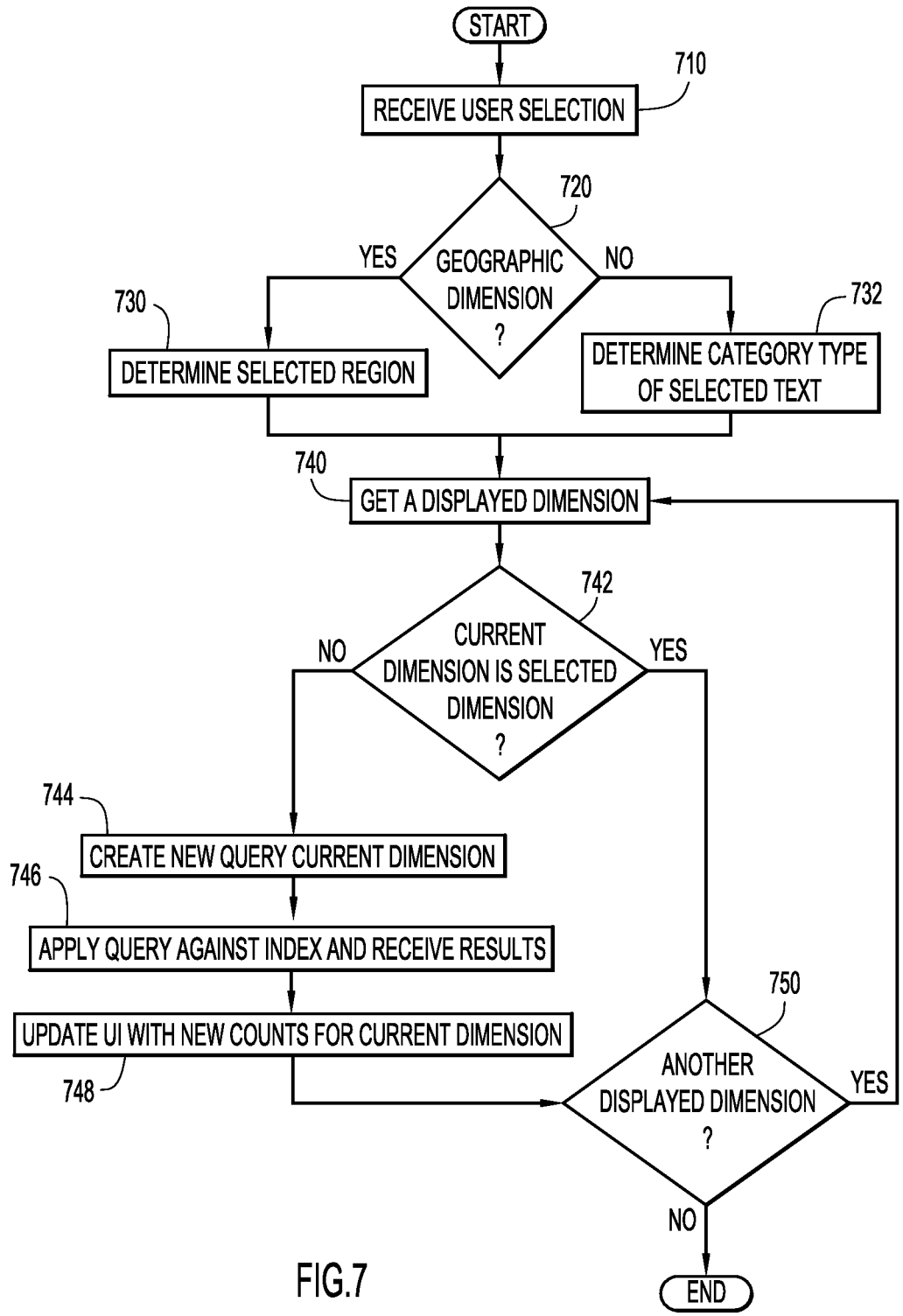
FIG. 7 is a flow diagram illustrating an example manner of searching for geographic information and displaying results in response to a user selection according to an embodiment of the present invention.

An example manner of searching for geographic information and displaying updated results (e.g., via an interface module and processor 20 of client system 130 and/or server system 120) in response to a user selection according to an embodiment of the present invention is illustrated in FIG. 7. Initially, an interface module receives a user selection action (e.g., a mouse click within view 610, 620, 630, or 640) at step 710. At step 720, the interface module determines whether the user has made a selection for a geographic dimension or a non-geographic dimension. For example, the interface module may determine whether the user clicked within a geographic view (e.g., view 640) or a non-geographic view (e.g., view 610, 620, or 630). If the user has made a selection within a geographic view, at step 730 the interface module determines which geographic region 644 the user selected. If the user has made a selection within a non-geographic view, at step 732 the interface module determines which category type the user selected. The interface module then begins a loop over dimensions viewed in the user interface (e.g., vehicle make, document type, date, and region) to update the corresponding displayed results (e.g., bar charts, maps, etc.). In particular, at step 740, the interface module gets the next dimension to update. At step 742, the interface module determines whether the current dimension and the user-selected dimension are the same. If not, the interface module creates a new query to request a count of records belonging to the user-selected category or region for the current dimension at step 744. The interface module applies the query against the index and receives results at step 746. The interface module updates the results displayed in the user interface for the current dimension at step 748. At step 750, the interface module determines whether results for another displayed dimension remain to be updated. If so, processing returns to step 740. Otherwise processing ends.

If the interface module determines at step 742 that the current dimension and the user-selected dimension are the same, processing may proceed to step 750 without updating the display of results for the dimension. For example, if the user selects a particular vehicle make from view 610 (FIG. 6), the bar chart 602 of view 610 may remain unaltered, rather than collapse to a single category.

It will be appreciated that the embodiments described above and illustrated in the drawings represent only a few of the many ways of implementing embodiments for indexing geographic information.

The environment of the present invention embodiments may include any number of computer or other processing systems (e.g., client or end-user systems, server systems, etc.) and storage systems (e.g., file systems, databases, or other repositories), arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., database software, communications software, etc.). These systems may include any types of monitors and input devices (e.g., keyboard, mouse, voice recognition, touch screen, etc.) to enter and/or view information.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, intranet, Internet, hardwire, modem connection, wireless, etc.). For example, the functions of the present invention embodiments may be distributed in any manner among various server systems, end-user/client and/or any other intermediary processing devices including third party client/server processing devices. The software and/or algorithms described above and illustrated in the flow charts may be modified in any manner that accomplishes the functions described herein. In addition, the functions in the flow charts or description may be performed in any order that accomplishes a desired operation.

The communication network may be implemented by any number of any types of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of data storage systems and structures to store information. The data storage systems may be implemented by any number of any conventional or other databases, file systems, caches, repositories, warehouses, etc.

The present invention embodiments may employ any number of any type of user interface (e.g., Graphical User Interface (GUI), command-line, prompt, etc.) for obtaining or providing information, where the interface may include any information arranged in any fashion. The interface may include any number of any types of input or actuation mechanisms (e.g., buttons, icons, fields, boxes, links, etc.) disposed at any locations to enter/display information (e.g., search queries, selection criteria, etc.) and initiate desired actions via any suitable input devices (e.g., mouse, keyboard, touch screen, pen, etc.), and may present any number of results in any form (e.g., bar graphs, line graphs, maps, tables, etc.).

It is to be understood that the software of the present invention embodiments could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present invention embodiments may alternatively be implemented by any type of hardware and/or other processing circuitry.

The present invention embodiments are not limited to the specific tasks, algorithms, parameters, data, or network/environment described above, but may be utilized for indexing and geographic information of any type (e.g., law enforcement, weather, economic, etc.). Geographic locations may be associated with regions of any sizes or shapes, and may be represented using any coordinates. Any number of fields of any data type (e.g., string, text, timestamp, integer, floating point, etc.) may be included in a record and index.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A system for retrieving geographic related information comprising:
   at least one processor configured to:
   generate an index for a plurality of information items, wherein the index includes for each information item:
   an information element; and
   a first identifier representing coordinates of a center location of a first geographic region closest to a geographic location associated with the information item;
   process a query using the index to retrieve aggregated information for one or more geographic regions; and
   present the aggregated information on a user interface.

2. The system of claim 1, wherein the first identifier is a geohash.

3. The system of claim 1, wherein the first identifier in the index enables utilization of a facet search technique to provide a fast procedure for returning counts of information items, and processing the query includes:
   performing the facet search technique of the index to determine counts of information elements for the one or more geographic regions.

4. The system of claim 1, wherein the index includes hierarchical levels of information and links between the hierarchical levels.

5. The system of claim 1, wherein the at least one processor is further configured to:
   color code the aggregated information and present the color-coded aggregated information on the user interface.

6. The system of claim 5, wherein the color-coded aggregated information is presented on an interactive geographic map of the user interface, and the at least one processor is further configured to:
   receive a selection of an area on the interactive geographic map; and
   process a query using the index to retrieve information pertaining to the area and update the user interface in response to the selection of the area.

7. The system of claim 5, wherein the aggregated information for a geographic region is color coded based on a count of information items relative to minimum and maximum counts of information items for a plurality of geographic regions.

8. The system of claim 1, wherein the index further includes a second identifier representing coordinates of a center location of a second geographic region closest to the geographic location associated with the information item, wherein the second geographic region is a smaller size than the first geographic region.

9. A computer program product for retrieving geographic related information comprising:
   a computer readable storage medium having computer readable program code embodied therewith for execution on a processing system, the computer readable program code comprising computer readable program code configured to:
   generate an index for a plurality of information items, wherein the index includes for each information item:
   an information element; and
   a first identifier representing coordinates of a center location of a first geographic region closest to a geographic location associated with the information item;
   process a query using the index to retrieve aggregated information for one or more geographic regions; and
   present the aggregated information on a user interface.

10. The computer program product of claim 9, wherein the first identifier is a geohash.

11. The computer program product of claim 9, wherein the first identifier in the index enables utilization of a facet search technique to provide a fast procedure for returning counts of information items, and processing the query includes:
    performing the facet search technique of the index to determine counts of information elements for the one or more geographic regions.

12. The computer program product of claim 9, wherein the index includes hierarchical levels of information and links between the hierarchical levels.

13. The computer program product of claim 9, wherein the computer readable program code is further configured to:
    color code the aggregated information and present the color-coded aggregated information on the user interface.

14. The computer program product of claim 13, wherein the color-coded aggregated information is presented on an interactive geographic map of the user interface, and wherein the computer readable program code is further configured to:
    receive a selection of an area on the interactive geographic map; and
    process a query using the index to retrieve information pertaining to the area and update the user interface in response to the selection of the area.

15. The computer program product of claim 13, wherein the aggregated information for a geographic region is color coded based on a count of information items relative to minimum and maximum counts of information items for a plurality of geographic regions.

16. The computer program product of claim 9, wherein the index further includes a second identifier representing coordinates of a center location of a second geographic region closest to the geographic location associated with the information item, wherein the second geographic region is a smaller size than the first geographic region.

17. A computer-implemented method of retrieving geographic related information comprising:
    generating an index for a plurality of information items, wherein the index includes for each information item:
    an information element; and
    a first identifier representing coordinates of a center location of a first geographic region closest to a geographic location associated with the information item;
    processing a query using the index to retrieve aggregated information for one or more geographic regions; and
    presenting the aggregated information on a user interface.

18. The computer-implemented method of claim 17, wherein the first identifier is a geohash.

19. The computer-implemented method of claim 17, wherein the first identifier in the index enables utilization of a facet search technique to provide a fast procedure for returning counts of information items, and processing the query includes:
    performing the facet search technique of the index to determine counts of information items for the one or more geographic regions.

20. The computer-implemented method of claim 17, wherein the index includes hierarchical levels of information and links between those hierarchical levels.

21. The computer-implemented method of claim 17, further comprising:

color coding the aggregated information and presenting the color-coded aggregated information on the user interface.

22. The computer-implemented method of claim 21, wherein the color-coded aggregated information is presented on an interactive geographic map of the user interface, and the computer-implemented method further comprising:

receiving a selection of an area on the interactive geographic map; and processing a query using the index to retrieve information pertaining to the area and update the user interface in response to selection of the area.

23. The computer-implemented method of claim 21, wherein the aggregated information for a geographic region is color-coded based on a count of information items relative to minimum and maximum counts of information items for a plurality of geographic regions.

24. The computer-implemented method of claim 17, wherein the index further includes a second identifier representing coordinates of a center location of a second geographic region closest to the geographic location associated with the information item, wherein the second geographic region is a smaller size than the first geographic region.

* * * * *